(12) United States Patent
Utgikar et al.

(10) Patent No.: US 10,263,914 B2
(45) Date of Patent: Apr. 16, 2019

(54) METHOD AND SYSTEM TO SPEED UP FLOW ROUTING IN SDN NETWORK

(71) Applicant: Telefonaktiebolaget LM Ericsson (publ), Stockholm (SE)

(72) Inventors: Anant P. Utgikar, San Jose, CA (US); Vijay Kachinthaya, Dublin, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 372 days.

(21) Appl. No.: 15/008,417

(22) Filed: Jan. 27, 2016

(65) Prior Publication Data

US 2017/0085501 A1 Mar. 23, 2017

Related U.S. Application Data

(60) Provisional application No. 62/221,566, filed on Sep. 21, 2015.

(51) Int. Cl.
| | |
|---|---|
| *H04L 12/947* | (2013.01) |
| *H04L 12/24* | (2006.01) |
| *H04L 12/813* | (2013.01) |
| *H04L 12/851* | (2013.01) |
| *H04L 12/26* | (2006.01) |

(Continued)

(52) U.S. Cl.
CPC ............ *H04L 49/25* (2013.01); *H04L 41/20* (2013.01); *H04L 43/16* (2013.01); *H04L 45/54* (2013.01); *H04L 45/64* (2013.01); *H04L 47/20* (2013.01); *H04L 47/2483* (2013.01); *H04L 49/15* (2013.01); *H04L 47/2441* (2013.01)

(58) Field of Classification Search
None
See application file for complete search history.

(56) References Cited

U.S. PATENT DOCUMENTS

| | | | | |
|---|---|---|---|---|
| 9,503,372 | B1 * | 11/2016 | Stark | ...................... H04L 45/745 |
| 9,729,442 | B1 * | 8/2017 | Stark | ...................... H04L 45/745 |
| 2015/0281106 | A1 * | 10/2015 | Lee | .......................... H04L 47/33 |
| | | | | 370/236 |

OTHER PUBLICATIONS

Hamed H., et al.,"Dynamic Rule-ordering Optimization for High-speed Firewall Filtering," ASIACCS '06, ACM, Mar. 21, 2006, pp. 332-342.

(Continued)

*Primary Examiner* — Ayaz R Sheikh
*Assistant Examiner* — Sori A Aga
(74) *Attorney, Agent, or Firm* — Nicholson De Vos Webster & Elliott LLP

(57) ABSTRACT

A method is executed by a network device in a network including a plurality of network devices. The network device implements a software defined networking (SDN) controller, where the SDN controller controls a first switch and a second switch in a network. The method improves packet processing performance in the network by reorganizing flow entries to decrease time to match active flows. The method includes receiving flow statistics for a first flow from the first switch, determining, based on the flow statistics for the first flow, that the first flow has a traffic usage that exceeds a pre-defined threshold, and in response to determining that the first flow has a traffic usage that exceeds the pre-defined threshold, programming the second switch to create a new flow table for processing the first flow or to increase a priority for matching a flow entry for the first flow within an existing flow table.

20 Claims, 7 Drawing Sheets

(51) Int. Cl.
*H04L 12/933* (2013.01)
*H04L 12/715* (2013.01)
*H04L 12/741* (2013.01)

(56) References Cited

OTHER PUBLICATIONS

OpenFlow Switch Specification Version 1.5.1 (Protocol version 0x06), ONF TS-025, The Open Networking Foundation, Mar. 26, 2015, 283 pages.

* cited by examiner

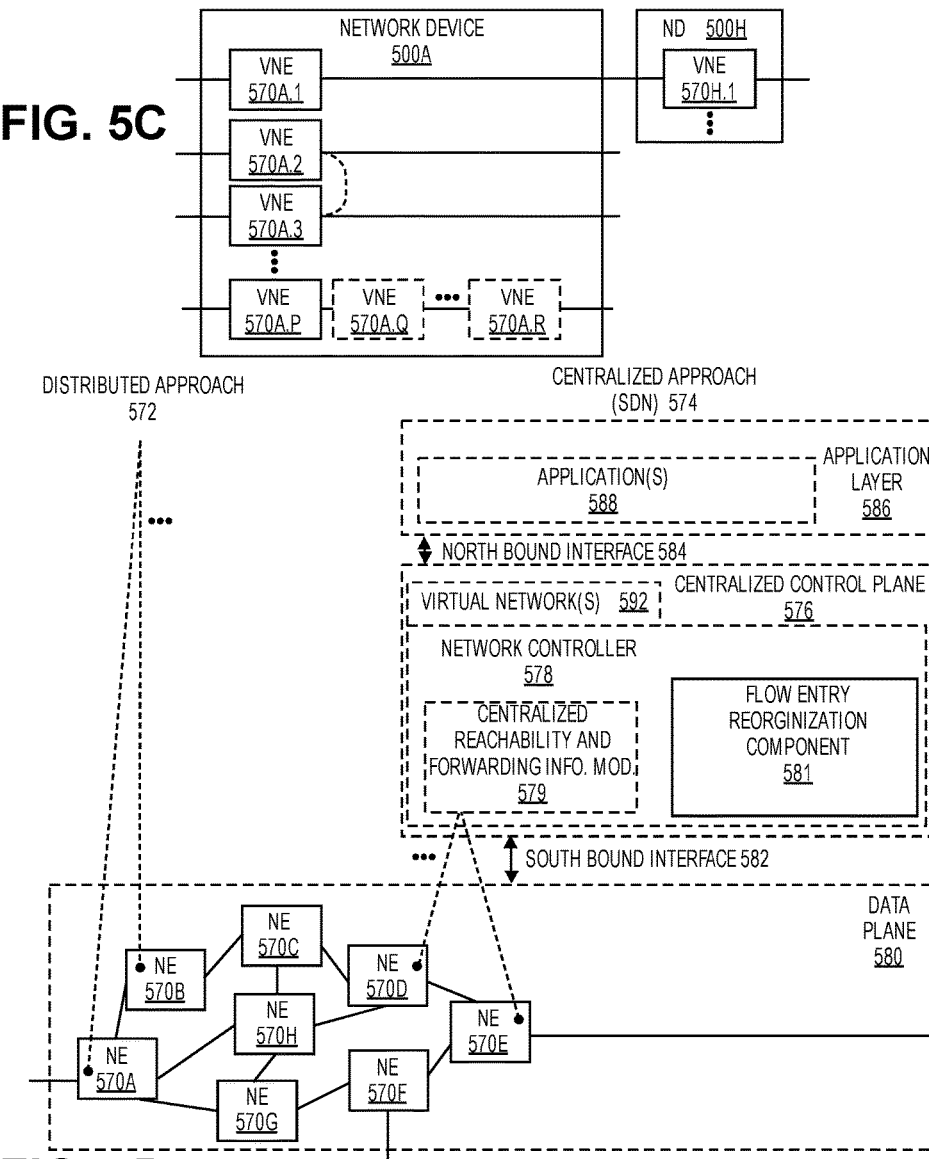
FIG. 5C
FIG. 5D
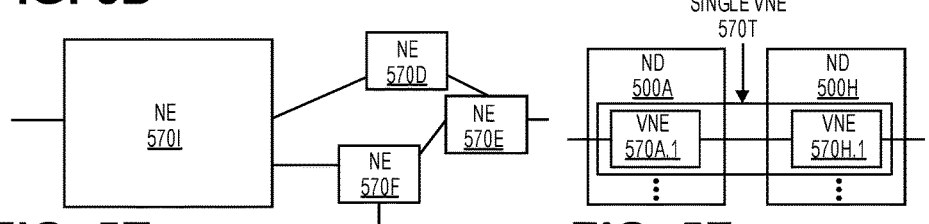
FIG. 5E
FIG. 5F

METHOD AND SYSTEM TO SPEED UP FLOW ROUTING IN SDN NETWORK

CROSS-REFERENCE TO RELATED APPLICATIONS

This application claims the benefit of U.S. Provisional Application No. 62/221,566, filed Sep. 21, 2015, which is hereby incorporated by reference.

FIELD

Embodiments of the invention relate to the field of software defined networks, and more specifically to improving packet processing performance for flows in software defined networks.

BACKGROUND

Software Defined Networking (SDN) is an approach to computer networking that employs a split architecture network in which the forwarding (data) plane is decoupled from the control plane. The use of a split architecture network simplifies the switches implementing the forwarding plane by shifting the intelligence and decision making of the network into one or more controller that oversee the switches. SDN facilitates rapid and open innovation at the network layer by providing a programmable network infrastructure.

OpenFlow is a protocol that enables controllers and switches in a software defined network to communicate with each other. An OpenFlow switch includes one or more flow tables for performing packet forwarding. Each flow table in the switch includes a set of flow entries. Each flow entry includes a match field for matching packets and a set of instructions to apply to matching packets. An OpenFlow controller can use OpenFlow to add, update, and delete flow entries in flow tables. Thus, OpenFlow enables a controller to dynamically program flow control policies in the network.

OpenFlow switches typically process a flow by matching packets of the flow against flow entries in a flow table in sequential order, from first to last. As a result, packet processing for some flows (e.g., flows that match flow entries that are lower in the flow table) take longer to match. This can result in poor packet processing performance (e.g., increased latency) for these flows.

SUMMARY

A method is executed by a network device in a network including a plurality of network devices. The network device implements a software defined networking (SDN) controller, where the SDN controller controls a first switch and a second switch in a network. The method improves packet processing performance in the network by reorganizing flow entries to decrease time to match active flows. The method includes receiving flow statistics for a first flow from the first switch, determining, based on the flow statistics for the first flow, that the first flow has a traffic usage that exceeds a pre-defined threshold, and in response to determining that the first flow has a traffic usage that exceeds the pre-defined threshold, programming the second switch to create a new flow table for processing the first flow or to increase a priority for matching a flow entry for the first flow within an existing flow table.

A network device is configured to implement a software defined networking (SDN) controller, where the controller controls a first switch and a second switch in a network. The SDN controller improves packet processing performance in the network by reorganizing flow entries to decrease time to match active flows. The network device includes a non-transitory machine-readable storage medium having stored therein a flow entry reorganization component. The network device further includes a set of one or more processors coupled to the non-transitory machine-readable storage medium. The set of one or more processors are configured to execute the flow entry reorganization component. The flow entry reorganization component is configured to receive flow statistics for a first flow from the first switch, determine, based on the flow statistics for the first flow, that the first flow has a traffic usage that exceeds a pre-defined threshold, and in response to a determination that the first flow has a traffic usage that exceeds the pre-defined threshold, program the second switch to create a new flow table for processing the first flow or to increase a priority for matching a flow entry for the first flow within an existing flow table.

A non-transitory computer readable medium has computer code stored therein that is to be executed by a set of one or more processors of a network device that implements a software defined networking (SDN) controller. The SDN controller to control a first switch and a second switch in a network. The computer code, when executed by the network device, causes the network device to perform operations including, receiving flow statistics for a first flow from the first switch, determining, based on the flow statistics for the first flow, that the first flow has a traffic usage that exceeds a pre-defined threshold, and in response to determining that the first flow has a traffic usage that exceeds the pre-defined threshold, programming the second switch to create a new flow table for processing the first flow or to increase a priority for matching a flow entry for the first flow within an existing flow table.

BRIEF DESCRIPTION OF THE DRAWINGS

The invention may best be understood by referring to the following description and accompanying drawings that are used to illustrate embodiments of the invention. In the drawings:

FIG. 5C illustrates various exemplary ways in which virtual network elements (VNEs) may be coupled according to some embodiments.

FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5E illustrates the simple case of where each of the NDs implements a single NE, but a centralized control plane has abstracted multiple of the NEs in different NDs into (to represent) a single NE in one of the virtual network(s), according to some embodiments.

FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

DESCRIPTION OF EMBODIMENTS

Figure 1:
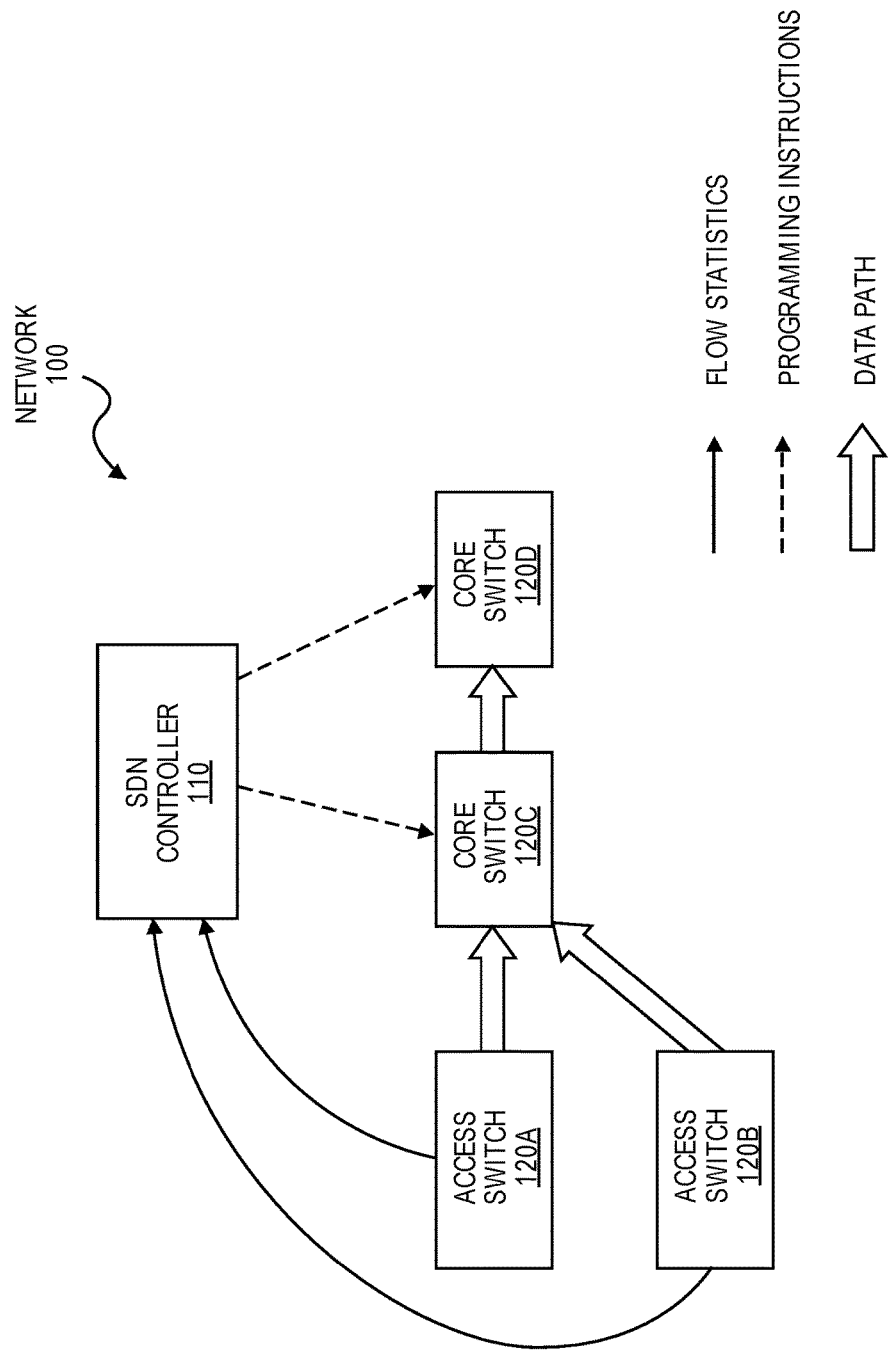
FIG. 1 is a block diagram of a network that implements reorganization of flow entries to improve packet processing performance for a flow, according to some embodiments.

The following description describes methods and apparatus for reorganizing flow entries to improve packet processing performance for a flow. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram of a network that implements reorganization of flow entries to improve packet processing performance for a flow, according to some embodiments. As illustrated, the network 100 includes a software defined networking (SDN) controller 110 and four switches 120 managed by the SDN controller 110. Switches 120A and 120B are access switches and switches 120C and 120D are core switches. An access switch, as used herein, is a switch that serves as an entry point into the network 100 (e.g., an edge switch). A core switch, as used herein, is a switch in the network 100 that is not an access switch. As shown, the exemplary network 100 includes a single SDN controller 110, two access switches (120A and 120B), and two core switches (120C and 120D). However, in other embodiments, the network 100 may include any number of SDN controllers 110, any number of access switches 120A, 120B, and any number of core switches 120C, 120D.

The SDN controller 110 can program each of the switches 120 with a set of flow entries to dynamically control flow processing in the network 100. The SDN controller 110 can communicate with the switches (and vice versa) using a communications protocol such as OpenFlow (e.g., OpenFlow 1.3) or similar protocol. In one embodiment, a flow entry includes a packet matching criteria (e.g., match fields in OpenFlow) and a corresponding set of instructions to execute when a packet matches the packet matching criteria. A packet is said to match a flow entry if the packet matches the packet matching criteria of the flow entry. A flow, as used herein, is a sequence of packets. A flow is said to match a flow entry if the packets of the flow match the packet matching criteria of the flow entry.

Typically, a switch 120 processes a packet by matching the packet against flow entries in a flow table in sequential order, from first to last. As a result, packet processing for some flows (e.g., flows that match flow entries that are lower in the flow table) take longer to match. This can result in poor packet processing performance (e.g., increased latency) for these flows, especially in large flow tables. Embodiments improve packet processing performance by determining which flows are active and reorganizing flow entries in the network 100 so that active flows are matched faster. Embodiments will primarily be described using OpenFlow as the communications protocol between the SDN controller 110 and the switches 120. However, embodiments can be implemented using other communications protocols.

As illustrated, traffic enters the network 100 at the access switches 120A, 120B and flows from left to right along a data path (e.g., from access switch 120A to core switch 120C to core switch 120D). In one embodiment, the SDN controller 110 programs or instructs one or more access switches 120A, 120B to collect flow statistics for flows that flow through the access switches 120A, 120B and to transmit the collected flow statistics to the SDN controller 110. The access switches 120A, 120B may collect flow statistics using a meter (e.g., OpenFlow meter) or similar mechanism. In OpenFlow, a meter is implemented using a meter table. A meter table consists of meter entries, defining per-flow meters. Per-flow meters enable OpenFlow to implement various quality of service (QoS) operations, such as rate-limiting, and can be combined with per-port queues to implement complex QoS frameworks. A meter measures the rate of packets assigned to it. A meter is typically associated with one or more flow entries. A flow entry can specify a meter in its instruction set and the meter is able to measure and control the rate of the aggregate of all flow entries to which it is attached.

In one embodiment, the SDN controller 110 programs or instructs access switches 120A, 120B to periodically report flow statistics to the SDN controller 110. In another embodiment, the SDN controller 110 may request flow statistics from the access switches 120A, 120B on-demand, as needed. In either case, the SDN controller 110 can receive flow statistics collected by one or more access switches 120A, 120B. For example, the SDN controller 110 may receive flow statistics pertaining to flows that enter the network 100 through the access switches 120A, 120B. The SDN controller 110 may define the parameters for what types of flow statistics the access switches 120A, 120B should collect and report to the SDN controller 110. For example, the SDN controller 110 may request that the access switches 120A, 120B report the amount of bandwidth consumed by each flow entering the network 100. The SDN controller 110 may also define thresholds (e.g., lower-bound thresholds and/or upper-bound thresholds) for reporting flow statistics in order to limit the amount of flow statistics it receives from the access switches 120A, 120B. For example, the SDN controller 110 may program the access switches 120A, 120B to only report flow statistics for flows that consume an amount of bandwidth that exceeds a predefined threshold level. Based on the flow statistics received from the access switches 120A, 120B, the SDN controller 110 determines which flows experience increased traffic usage. The SDN controller 110 may then program one or more of the downstream core switches 120C, 120D to create a new flow table for processing the flow or increase a priority for matching a flow entry for the flow within an existing flow table. Creating a new flow table (and flow entries in the new flow table) for processing the flow ensures that flow entries that match the flow will be located at the top or near the top of the new flow table. As such, the flow will be matched quicker compared to if the flow entry was located at the bottom or near the bottom of a flow table. In one embodiment, if the SDN controller 110 determines that the flow is a long-term flow and/or has a high bandwidth requirement (e.g., flow that carries traffic for HD video streaming), a dedicated flow table for that flow can be created. A dedicated flow table for a particular flow only includes flow entries that match the particular flow. This assures that the flow will be matched quickly since the dedicated flow table will not include flow entries that match other flows. Increasing the priority for matching a flow entry for the flow will also help the flow match quicker. Priority for matching a flow entry can be increased, for example, by moving up that flow entry higher within an existing flow table. Since flow matching in a flow table typically occurs in serial order, from first flow entry to last flow entry, moving up a flow entry higher within an existing flow table will help flows that match that flow entry match faster. In this way, the SDN controller 110 may reorganize flow entries (e.g., by creating a new flow table or reordering flow entries within an existing flow table) to improve packet processing for active flows.

In one embodiment, a timeout value accounting for traffic burst duration is associated with the reorganized flow entries. When the timeout value expires, the reorganized flow entries are returned to their previous state (before the reorganization). For example, the SDN controller 110 may determine, based on historical flow statistics, that a particular type of flow typically has a traffic burst duration of 30 seconds. In this case, the SDN controller 110 reorganizes the flow entries that match the flow (e.g., by creating a new flow table (with flow entries) for processing the flow and/or moving up a flow entry that matches the flow within an existing flow table) and associates the reorganized flow entries with a timeout value of 30 seconds. When the timeout value expires, the SDN controller 110 returns the reorganized flow entries to their previous state (before the reorganization). In this way, packet processing performance for the flow is improved while the flow experiences a traffic burst, and is returned to a previous state after the traffic burst is expected to be over. In one embodiment, the SDN controller 110 may program one or more switches 120 to return reorganized flow entries back to their previous state based on analysis of real-time flow statistics, without employing a timeout mechanism.

Figure 2:
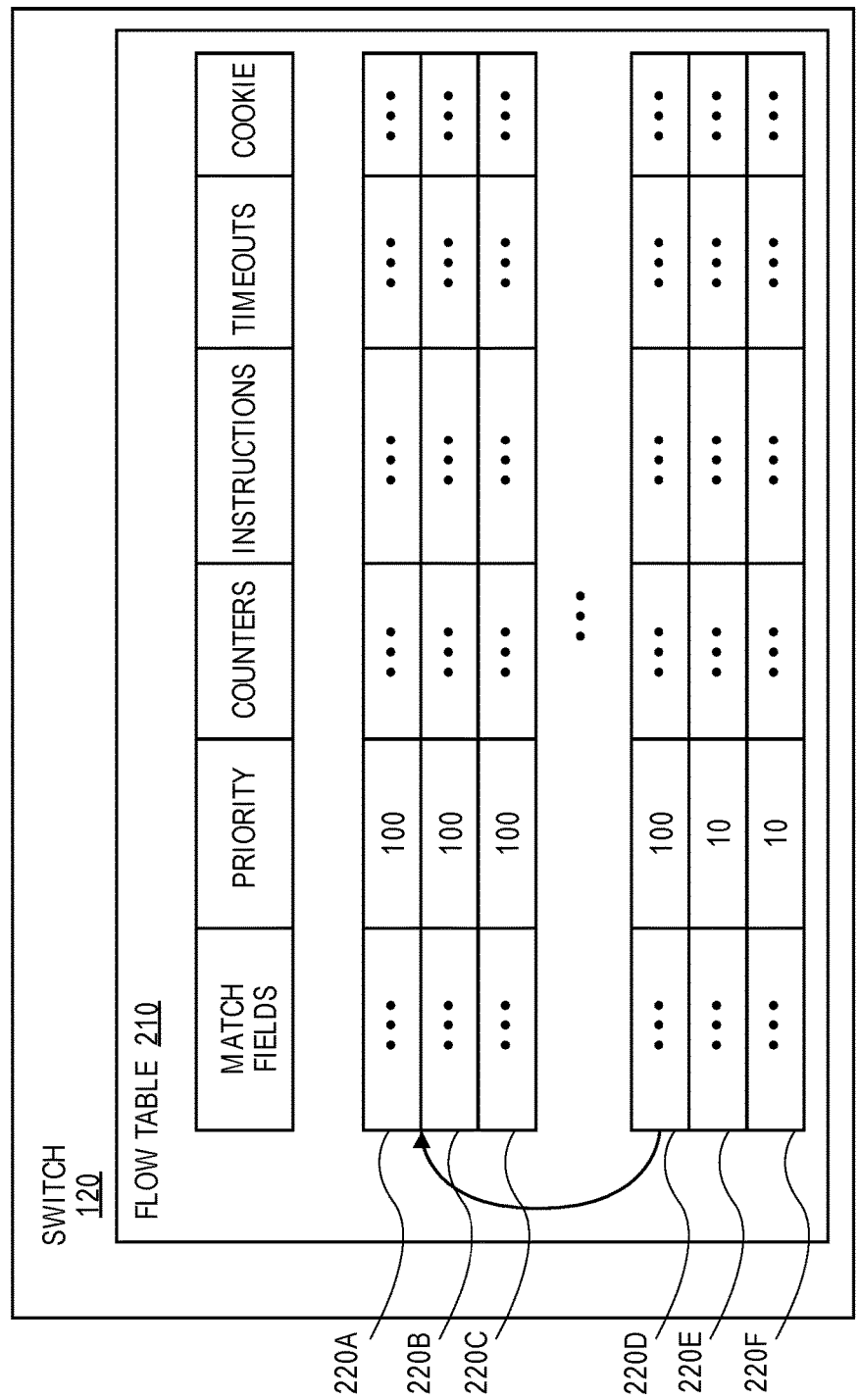
FIG. 2 is a diagram illustrating reordering of a flow entry in a switch to improve packet processing performance for a flow, according to some embodiments.

FIG. 2 is a diagram illustrating reordering of a flow entry in a switch to improve packet processing performance for a flow, according to some embodiments. A switch 120 includes a flow table 210 that includes multiple flow entries 220. Each flow entry 220 has match fields, a priority field, a counters field, an instructions field, a timeouts field, and a cookie field. Typically, when the switch 120 receives a packet to forward, the switch 120 matches the packet against the flow entries 220 in serial order from first to last. If a matching flow entry 220 is found, then the instructions of that flow entry 220 are executed. For simplicity and clarity, the switch 120 is shown as having a single flow table 210. However, in other embodiments, the switch 120 may include any number of flow tables.

An SDN controller 110 may determine, based on analysis of flow statistics, that a particular flow is highly active (e.g., experiences increased traffic usage). In response, the SDN controller 110 may program the switch 120 to move a flow entry that matches the highly active flow higher up in the flow table 210. For example, suppose the SDN controller 110 determines that a flow that matches flow entry 220D is highly active. The SDN controller 110 may then program the switch 120 to move flow entry 220D higher up in the flow table 210 (e.g., in between flow entry 220A and flow entry 220B, as indicated by the arrow). By moving the flow entry 220D higher up in the flow table 210, the switch 120 will match packets of the highly active flow faster than when the flow entry 220D was lower in the flow table 210, thereby improving packet processing performance for the highly active flow. Preferably, flow entries 220 should be reordered such that the behavior of flows is not changed, other than the matching speed. Thus, in one embodiment, flow entry reordering is only allowed within a local priority range. For example, as illustrated, flow entry 220D is moved higher up in the flow table 210 within flow entries having a priority value of 100. Keeping the flow entry within a local priority range ensures that the reordering does not change flow processing behavior. In one embodiment, reordered flow entries are associated with a timeout value that accounts for traffic burst duration. When the timeout value expires, the reordered flow entries are moved back down to their previous position (before the reordering). In this way, flow entries are reordered during the traffic burst (to increase matching speed) but then returned to their previous position when the traffic burst is expected to be over.

Figure 3A:
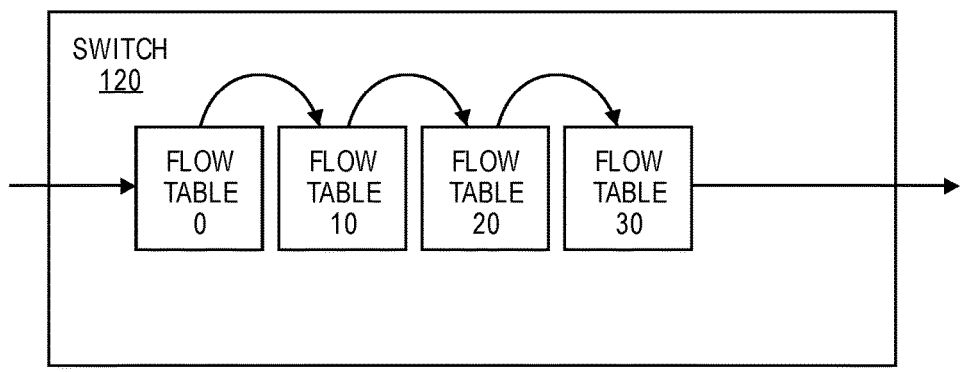
FIG. 3A is a diagram illustrating packet processing in a switch, according to some embodiments.

FIG. 3A is a diagram illustrating packet processing in a switch, according to some embodiments. A switch 120 includes a packet processing pipeline having four flow tables (flow tables 0, 10, 20, and 30). When the switch 120 receives a packet to forward, pipeline processing for the packet starts at flow table 0. The packet is matched against flow entries in flow table 0, and may be matched against flow entries in subsequent flow tables in the pipeline, depending on the match in flow table 0. For example, as illustrated in FIG. 3A, the packet is matched against flow entries in flow table 0, flow table 10, flow table 20, and flow table 30, before the packet is forwarded out of the switch 120.

Figure 3B:
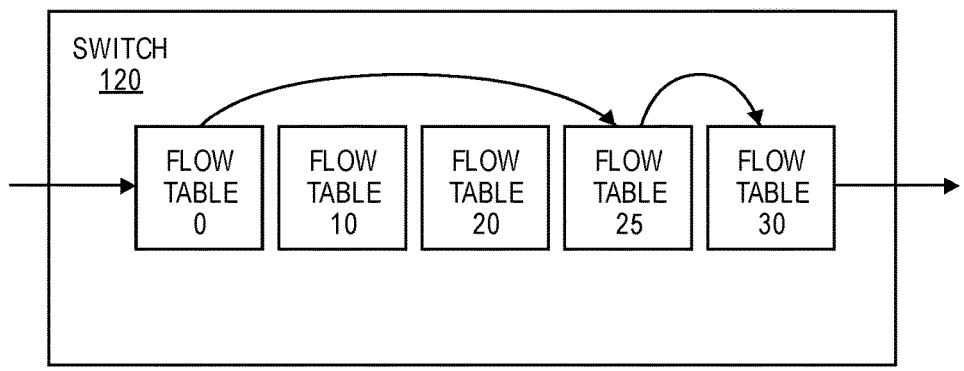
FIG. 3B is a diagram illustrating creation of a new flow table in a switch to improve packet processing performance for a flow, according to some embodiments.

FIG. 3B is a diagram illustrating creation of a new flow table in a switch to improve packet processing performance for a flow, according to some embodiments. An SDN controller 110 may determine, based on analysis of flow statistics, that a flow to which a packet belongs is highly active (e.g., experiences increased traffic usage). In response, the SDN controller 110 may then program the switch 120 to create a new flow table 25, as illustrated in FIG. 3B, for processing the highly active flow. Packet processing for packets of the highly active flow begins with flow table 0 and then is directed to the new flow table 25 (instead of going through flow table 10 and flow table 20 as before in FIG. 3A). Preferably, the packet processing pipeline with the new flow table 25 should process the packet in the same manner as the previous pipeline (before the new flow table was created). The new flow table 25 may include flow entries similar to those in flow table 10 and flow table 20 for processing the highly active flow, in order to preserve the original packet processing behavior. Since, the new flow table 25 is a newly created flow table, the flow entries that match the highly active flow will be located at the top of the new flow table, and thus match quickly. Once the packet is processed by the new flow table 25, the packet may be processed by other subsequent flow tables (e.g., flow table 30) and forwarded out of the switch 120. In one embodiment, the newly created flow table is a dedicated flow table for processing the highly active flow that only includes flow entries for processing the highly active flow and does not include flow entries for any other flows. A dedicated flow table may be useful for flows that require high packet processing performance such as flows that carry HD video streams. In one embodiment, flow entries inserted into the newly created flow table are associated with a timeout value that accounts for traffic burst duration. When the timeout value expires, the flow entries in the newly created table are merged back to their previous flow table (before the new flow table was created). In this way, flow entries are reorganized during the traffic burst (to increase matching speed) but then returned to their previous position when the traffic burst is expected to be over.

Figure 4:
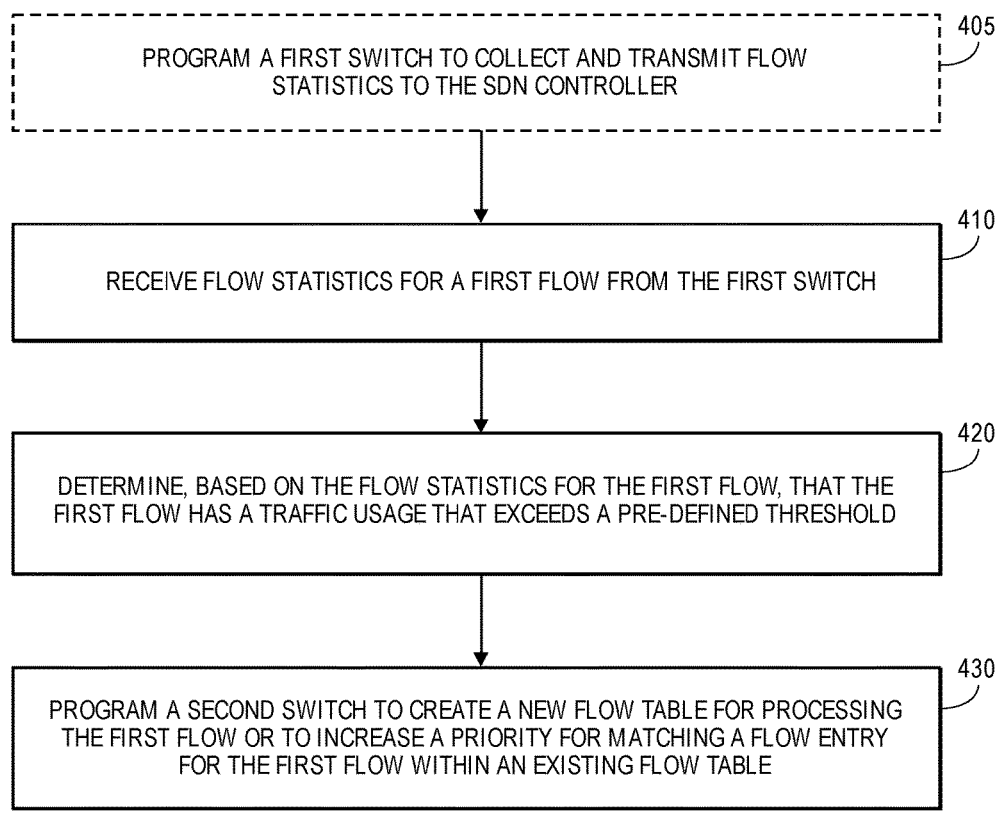
FIG. 4 is a flow diagram illustrating a method for reorganizing a flow entry in a switch to improve packet processing performance for a flow, according to some embodiments.

FIG. 4 is a flow diagram illustrating a method for reorganizing a flow entry in a switch to improve packet processing performance for a flow, according to some embodiments. In one embodiment, the operations of the flow diagram may be performed/executed by a network device implementing an SDN controller 110. The operations in this flow diagram will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram.

In one embodiment, the SDN controller 110 programs a first switch to collect and transmit flow statistics to the SDN controller 110 (block 405). In one embodiment, the SDN controller 110 programs the first switch to periodically transmit flow statistics to the SDN controller 110 (e.g., every minute). In one embodiment, the SDN controller 110 programs the first switch to only transmit flow statistics that exceed a pre-defined upper-bound threshold or that fall below a pre-defined threshold. This serves to limit the amount of flow statistics that the first switch transmits to the SDN controller 110. The SDN controller 110 then receives flow statistics for a first flow from the first switch (block 410). The SDN controller 110 then determines, based on the flow statistics for the first flow, that the first flow has a traffic usage that exceeds a pre-defined threshold (block 420). If the SDN controller 110 determines that the first flow has a traffic usage that exceeds a pre-defined threshold, the SDN controller 110 programs a second switch to create a new flow table for processing the first flow or to increase a priority for matching a flow entry for the first flow within an existing flow table (block 430). As described herein above, creating a new flow table for processing the first flow or increasing a priority for matching a flow entry for the first flow within an existing flow table generally allows packets belonging to the first flow to match faster. In one embodiment, the new flow table is a dedicated flow table for processing the first flow. In one embodiment, the priority for matching the flow entry is increased by moving the flow entry higher up within its current flow table. In one embodiment, the priority for matching the flow entry is increased within a local priority range. In one embodiment, the second switch is a switch that is downstream from the first switch. In one embodiment, the first switch is an access switch 120A, 120B and the second switch is a core switch 120C, 120D.

In one embodiment, the SDN controller 110 determines, based on the flow statistics for the first flow, that the traffic usage of the first flow falls below the pre-defined threshold. This may be an indication that the first flow is no longer experiencing high traffic usage. In response, the SDN controller 110 programs the second switch to merge the flow entry for the first flow in the new flow table into another flow table or to decrease the priority for matching the flow entry for the first flow within the existing flow table. For example, in some embodiments, the flow entry for the first flow is returned back to its original state (before reorganization). In one embodiment, the SDN controller 110 determines, based on the flow statistics for the first flow, a timeout period indicative of an expected traffic burst duration for the first flow. The SDN controller 110 may then associate the determined timeout period with the reorganized flow entry (e.g., the flow entry in the new flow table or the flow entry that was moved up). When the timeout period elapses, the SDN controller 110 may program the second switch to merge the flow entry in the new flow table into another flow table or decrease the priority for matching the flow entry within the existing flow table. In this way, flow entries are reorganized during the traffic burst (to increase matching speed) but then returned to their previous position when the traffic burst is expected to be over.

The process thus identifies an active flow and speeds up flow matching for the active flow by reorganizing flow entries that match the active flow. This decreases the time to match the active flow, which leads to faster data plane forwarding (e.g., lower latency) for the active flow. The process may be particularly applicable for speeding up flows that have predictable traffic patterns that can be readily identified from an analysis of flow statistics (e.g., traffic for high frequency stock trading). Also, the process may be particularly advantageous for flows that have a long data path because this gives the SDN controller 110 additional time to identify the active flow and to reorganize flow entries in any downstream switches on the data path before the flow reaches the downstream switches.

Figures 5A, 5B:
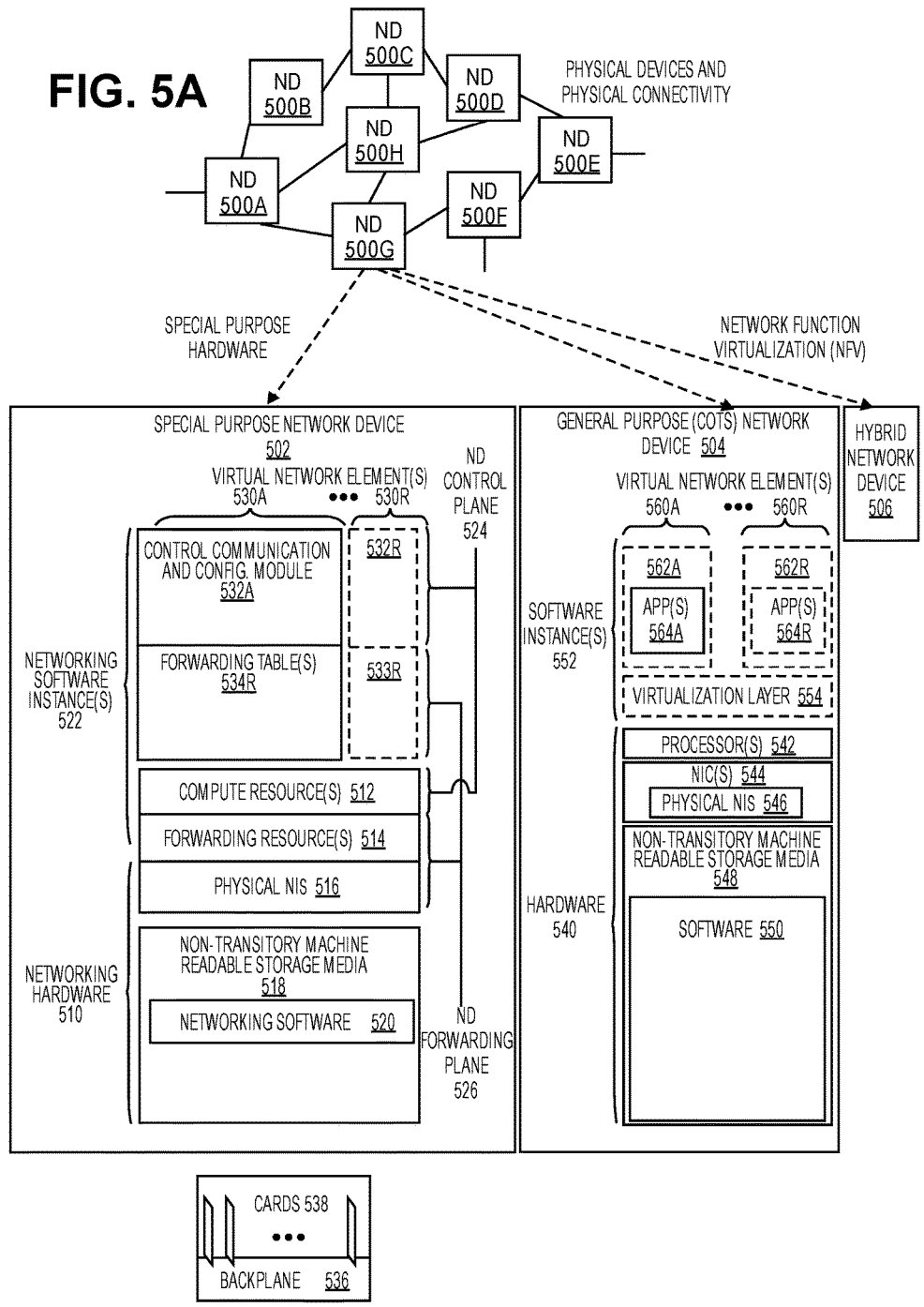
FIG. 5A illustrates connectivity between network devices (NDs) within an exemplary network, as well as three exemplary implementations of the NDs, according to some embodiments.
FIG. 5B illustrates an exemplary way to implement a special-purpose network device according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application—specific integrated—circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code which when executed by networking hardware 510, causes networking hardware 510 to perform operations of one or more embodiments of the present invention as part of networking software instances 522.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

Software 550 can include code which when executed by processor(s) 542, cause processor(s) 542 to perform operations of one or more embodiments of the present invention as part of software containers 562A-R.

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 5C illustrates various exemplary ways in which VNEs may be coupled according to some embodiments. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics.

Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the network controller 578 may include a flow entry reorganization component 581 that when executed by the network controller 578, causes the network controller 578 to perform operations of one or more embodiments described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
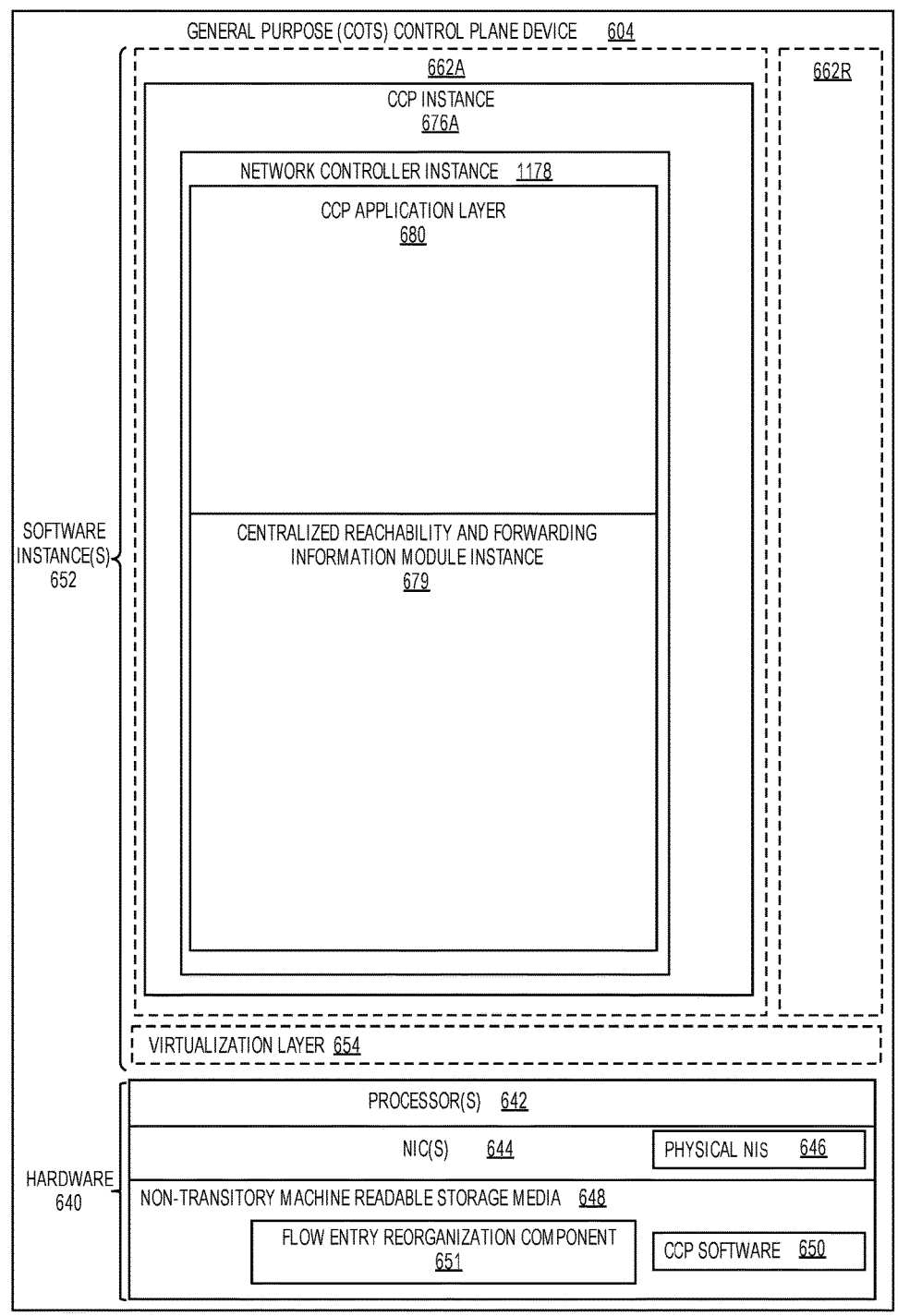
FIG. 6 illustrates a general purpose control plane device with centralized control plane (CCP) software, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650 and a flow entry reorganization component 651.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view.

The flow entry reorganization component 651 can be executed by hardware 640 to perform operations of one or more embodiments of the present invention as part of software instances 652.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the disclosure as set forth in the following claims.

What is claimed is:

1. A method executed by a network device in a network including a plurality of network devices, the network device implementing a software defined networking (SDN) controller, where the SDN controller controls a first switch and a second switch in a network, the method to improve packet processing performance in the network by organizing flow entries to decrease time to match active flows, the method comprising:
receiving flow statistics for a first flow from the first switch;
determining, based on the flow statistics for the first flow, that the first flow has a traffic usage that exceeds a pre-defined threshold; and
in response to determining that the first flow has a traffic usage that exceeds the pre-defined threshold, programming the second switch to create a new flow table for processing the first flow or to increase a priority for matching a flow entry for the first flow within an existing flow table.

2. The method of claim 1, further comprising:
determining, based on the flow statistics for the first flow, that the traffic usage of the first flow falls below the pre-defined threshold; and
in response to determining that the traffic usage of the first flow falls below the pre-defined threshold, programming the second switch to merge a flow entry for the first flow in the new flow table into another flow table or to decrease a priority for matching the flow entry for the first flow within the existing flow table.

3. The method of claim 1, wherein the second switch is downstream from the first switch.

4. The method of claim 1, wherein the first switch is an access switch and the second switch is a core switch.

5. The method of claim 1, further comprising:
programming the first switch to periodically transmit flow statistics gathered by the first switch to the SDN controller.

6. The method of claim 1, further comprising:
programming the first switch to transmit flow statistics that exceed a pre-defined upper-bound threshold or that fall below a pre-defined lower-bound threshold.

7. The method of claim 1, further comprising:
determining, based on the flow statistics for the first flow, a timeout period indicative of an expected traffic burst duration for the first flow; and
programming the second switch to merge a flow entry for the first flow in the new flow table into another flow table or to decrease a priority for matching the flow entry for the first flow within the existing flow table after the timeout period elapses.

8. The method of claim 1, wherein the new flow table is a dedicated flow table for processing the first flow.

9. The method of claim 1, wherein the priority for matching the flow entry for the first flow is increased within a local priority range.

10. A network device to implement a software defined networking (SDN) controller, where the SDN controller controls a first switch and a second switch in a network, the SDN controller to improve packet processing performance in the network by organizing flow entries to decrease time to match active flows, the network device comprising:
a non-transitory machine-readable storage medium having stored therein a flow entry reorganization component; and
a set of one or more processors coupled to the non-transitory machine-readable storage medium, the set of one or more processors configured to execute the flow entry reorganization component, the flow entry reorganization component configured to receive flow statistics for a first flow from the first switch,
determine, based on the flow statistics for the first flow, that the first flow has a traffic usage that exceeds a pre-defined threshold, and
in response to a determination that the first flow has a traffic usage that exceeds the pre-defined threshold, program the second switch to create a new flow table for processing the first flow or to increase a priority for matching a flow entry for the first flow within an existing flow table.

11. The network device of claim 10, wherein the flow entry reorganization component is further configured to
determine, based on the flow statistics for the first flow, that the traffic usage of the first flow falls below the pre-defined threshold; and
in response to a determination that the traffic usage of the first flow falls below the pre-defined threshold, program the second switch to merge a flow entry for the first flow in the new flow table into another flow table or to decrease a priority for matching the flow entry for the first flow within the existing flow table.

12. A non-transitory machine-readable storage medium having computer code stored therein, which when executed by a set of one or more processors of a network device that implements a software defined networking (SDN) controller that is to control a first switch and a second switch in a network, causes the network device to perform operations comprising:
receiving flow statistics for a first flow from the first switch;
determining, based on the flow statistics for the first flow, that the first flow has a traffic usage that exceeds a pre-defined threshold; and
in response to determining that the first flow has a traffic usage that exceeds the pre-defined threshold, programming the second switch to create a new flow table for processing the first flow or to increase a priority for matching a flow entry for the first flow within an existing flow table.

13. The non-transitory machine-readable storage medium of claim 12, wherein the computer code, when executed by the set of one or more processors, causes the network device to perform further operations comprising:
determining, based on the flow statistics for the first flow, that the traffic usage of the first flow falls below the pre-defined threshold; and
in response to determining that the traffic usage of the first flow falls below the pre-defined threshold, programming the second switch to merge a flow entry for the first flow in the new flow table into another flow table or to decrease a priority for matching the flow entry for the first flow within the existing flow table.

14. The non-transitory machine-readable storage medium of claim 12, wherein the second switch is downstream from the first switch.

15. The non-transitory machine-readable storage medium of claim 12, wherein the first switch is an access switch and the second switch is a core switch.

16. The non-transitory machine-readable storage medium of claim 12, wherein the computer code, when executed by the set of one or more processors, causes the network device to perform further operations comprising:
programming the first switch to periodically transmit flow statistics gathered by the first switch to the SDN controller.

17. The non-transitory machine-readable storage medium of claim 12, wherein the computer code, when executed by the set of one or more processors, causes the network device to perform further operations comprising:
programming the first switch to transmit flow statistics that exceed a pre-defined upper-bound threshold or that fall below a pre-defined lower-bound threshold.

18. The non-transitory machine-readable storage medium of claim 12, wherein the computer code, when executed by the set of one or more processors, causes the network device to perform further operations comprising:
determining, based on the flow statistics for the first flow, a timeout period indicative of an expected traffic burst duration for the first flow; and
programming the second switch to merge a flow entry for the first flow in the new flow table into another flow table or to decrease a priority for matching the flow entry for the first flow within the existing flow table after the timeout period elapses.

19. The non-transitory machine-readable storage medium of claim 12, wherein the new flow table is a dedicated flow table for processing the first flow.

20. The non-transitory machine-readable storage medium of claim 12, wherein the priority for matching the flow entry for the first flow is increased within a local priority range.

* * * * *